United States Patent
Rieger et al.

(10) Patent No.: US 6,705,142 B1
(45) Date of Patent: Mar. 16, 2004

(54) METAL SHAPING PROCESS USING A NOVEL TWO PHASE COOLING LUBRICANT SYSTEM

(75) Inventors: Hartmut Rieger, Boxberg (DE); Daniel Juzl, Auburn Hills, MI (US)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 10/049,166
(22) PCT Filed: Jul. 28, 2000
(86) PCT No.: PCT/EP00/07324
§ 371 (c)(1),
(2), (4) Date: Sep. 16, 2002
(87) PCT Pub. No.: WO01/10986
PCT Pub. Date: Feb. 15, 2001

(30) Foreign Application Priority Data

Aug. 7, 1999 (DE) .......................... 199 37 427
Apr. 2, 2000 (DE) .......................... 100 21 168

(51) Int. Cl.$^7$ ................................ B21B 45/02
(52) U.S. Cl. .............. 72/42; 72/43; 72/44; 83/169; 407/11; 408/61
(58) Field of Search ............... 83/15, 16, 168–171; 82/50; 407/11; 408/56, 61; 409/135, 136; 451/449, 450, 488; 72/39, 41–45; 210/708, 712, 713, 799, 252, 253, 255, 258, 335

(56) References Cited

U.S. PATENT DOCUMENTS

| | | | | |
|---|---|---|---|---|
| 3,837,199 A | * | 9/1974 | Larsonneur | 72/45 |
| 4,934,445 A | * | 6/1990 | Plata et al. | 164/486 |
| 5,534,155 A | * | 7/1996 | Schimion et al. | 210/695 |
| 5,678,466 A | * | 10/1997 | Wahl | 83/168 |
| 6,200,490 B1 | * | 3/2001 | Hirs | 210/799 |
| 6,318,219 B1 | | 11/2001 | Kato | |
| 2001/0056046 A1 | | 12/2001 | Geke et al. | |

FOREIGN PATENT DOCUMENTS

| | | | |
|---|---|---|---|
| CH | 543344 | * 12/1973 | .......... 72/42 |
| DE | 1 049 263 | 1/1959 | |
| DE | 37 20 566 | 11/1987 | |
| DE | 197 03 083 | 7/1998 | |
| WO | WO 99/11426 | 3/1999 | |

OTHER PUBLICATIONS

Ullmann's Encyclopedia of Industrial Chemistry 5$^{th}$ Edition, vol. A 15, pp. 479–486.

* cited by examiner

*Primary Examiner*—Ed Tolan
(74) *Attorney, Agent, or Firm*—Stephen D. Harper; Glenn E. J. Murphy

(57) ABSTRACT

A process for the cutting or non-cutting forming of metals using two cooling lubricants, wherein an oil or a first emulsion having an oil content of at least 10 wt. % is applied to the workpiece, as a first cooling lubricant, at the tribo-zone and, at the same time, an oil-free cooling lubricant or a second emulsion that is an oil-in-water emulsion having an oil content of less than 10 wt. % is applied, as a second cooling lubricant, adjacent to the tribo-zone. Depending on the metal-working technique, a two-component nozzle is preferably used for supplying the first and second cooling lubricants, the jet of second cooling lubricant surrounding the jet of first cooling lubricant concentrically. Alternatively, it is possible to supply the first cooling lubricant directly to the tribo-zone through channels in the tool, while the second cooling lubricant is applied at the periphery. The cooling lubricants that run off are together fed to a storage container, where phase separation of the first and second cooling lubricants takes place. A device for carrying out the process having two storage containers, wherein, in order to complete the phase separation, the phase of the first cooling lubricant separated out in the first container is transferred into the second container.

28 Claims, 3 Drawing Sheets

METAL SHAPING PROCESS USING A NOVEL TWO PHASE COOLING LUBRICANT SYSTEM

CROSS-REFERENCE TO RELATED APPLICATIONS

This application is a U.S. National Stage application under 35 U.S.C. § 371 of International Application No. PCT/EP00/07324, claiming priority under 35 U.S.C. § 365 of PCT/EP00/07324, filed Jul. 28, 2000, in the European Patent Office, and under 35 U.S.C. § 119 of DE 199 37 427.9, filed on Aug. 7, 1999, and DE 100 21 168.2 filed Apr. 29, 2000, in the German Patent Office.

This invention is in the field of the cutting and non-cutting forming of metals. It relates to a novel process for using the required cooling lubricants.

Examples of the cutting machining (=forming) of metals are cutting, drilling, turning or mining, and examples of non-cutting forming are deep-drawing and massive forming. Liquid auxiliaries, so-called cooling lubricants, are required for those processes. The function of those auxiliaries is essentially to reduce friction between tool and workpiece, to dissipate the heat that is formed and to remove abraded metal (fine abraded material, dusts) or chips. They must also prevent discoloration and/or corrosion of the machined workpieces.

An overview of the shaping metal-working processes and the auxiliaries customarily used therefor will be found, for example, in Ulimann's Encyclopedia of Industrial Chemistry, 5th Ed., Vol. A15, 479–486. The auxiliaries that come into consideration are in forms ranging from oils to oil-in-water emulsions to aqueous solutions. Usually there are added to the base liquids, oil or water, further components, such as viscosity regulators, antifoamers or corrosion inhibitors. Especially in the case of oil-based systems, lubricating additives, for example so-called "EP additives", are also customary. For the formation of emulsions, the use of emulsifiers is generally required; in many cases, the agents are also stabilised with biocides.

The oily components used nowadays are preferably paraffin oils or mineral oils. In addition, so-called synthetic lubricants ("synthetic oils"), such as polyolefins, also come into consideration. Other examples of oily components are ester oils, which may be based on vegetable or animal oils, acetals or dialkyl ethers. By selecting the oils and mixtures thereof according to properties, such as polarity or viscosity, it is possible to formulate metal-working agents that meet the technical requirements of a very wide variety of fields.

In order to display an adequate lubricating action, the cooling lubricants must contain components having a lubricating action. In the case of water-soluble cooling lubricants that do not contain an oily phase, polyglycols are frequently used as the lubricating component. Although such aqueous cooling lubricants effect good heat dissipation, the lubricating action thereof is limited. On the other hand, substantially anhydrous oils may be used as cooling lubricants. They exhibit a very good lubricating action and, owing to the hydrophobic nature thereof, also a very good anti-corrosion action, but the rinsing and cooling action thereof is limited because of the viscosity and the low heat capacity of the oils. The use of oils as cooling lubricants has various disadvantages: The high price of the oils and the expenditure on maintenance required, for example, because the resulting chips and swarf are difficult to filter off, lead to high costs. Disposal of the resulting oil-impregnated chips and swarf poses problems, since they may lead to deflagrations or explosions, for example on attempted metallurgical reprocessing. The oil/air mixture that forms at the processing machine may also lead to explosions or deflagrations. For that reason the machines are encased, at great expense, in order to prevent the uncontrolled admission of air. Before the machine is opened, for example in order to change the workpiece, the oil-containing air must first be removed by suction through filters, which slows down the production cycles.

Cooling lubricants in the form of oil-in-water emulsions represent a widely used compromise as regards costs and expenditure, heat dissipation, lubricating action and corrosion protection. Those emulsions generally contain from about 0.05 to about 5 wt. % of an oily phase, which is dispersed in the aqueous phase with the aid of emulsifiers in the form of droplets in the submicrometer and micrometer range. A further important constituent of such cooling lubricant emulsions are corrosion inhibitors.

In order to improve the lubricating action of purely oily cooling lubricants (which are also known as cutting oils or forming oils) or of oil-containing cooling lubricant emulsions, so-called EP additives are frequently added. Those additives may be selected from organic compounds containing phosphorus, sulfur or, where demands as regards environmental protection are not as great, chlorine. Organosulfur compounds in particular are frequently used as EP additives.

An object of the present invention is to provide a process for the cutting or non-cutting forming of metals that is optimised both as regards lubrication and as regards cooling and the removal of chips.

Figure 1:
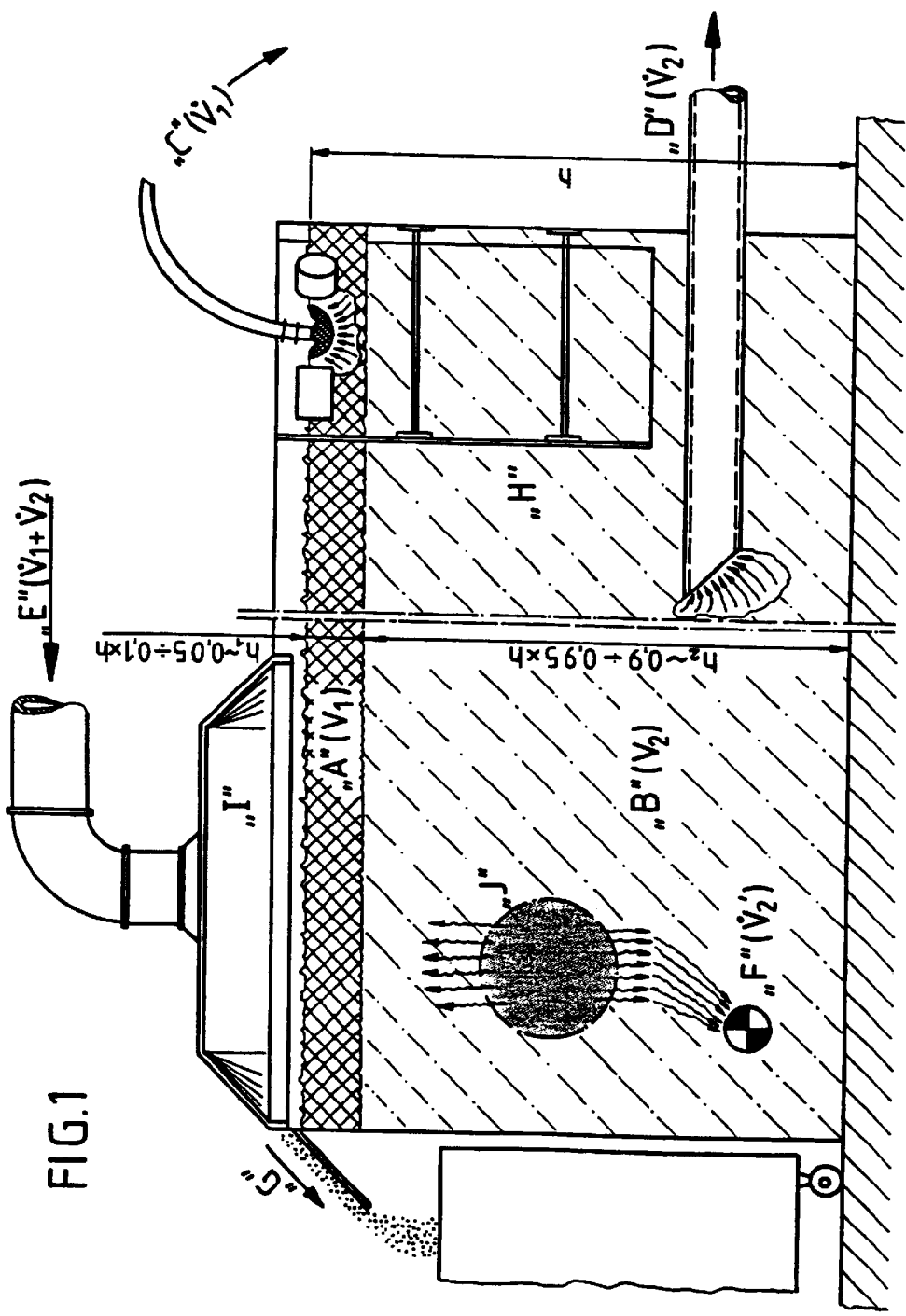
FIG. 1 depicts a common storage container for first and second cooling lubricants, wherein the first cooling lubricant is specifically lighter than the second cooling lubricant.

| Legend to the Drawings | |
|---|---|
| A = | first cooling lubricant, e.g. grinding oil, cutting or forming oil, universal oil or highly concentrated EP emulsion, preferable on a natural basis |
| B = | second cooling lubricant, e.g. passivating solution, grinding solution, or emulstion of low concentration |
| C = | skimmer system as withdrawal system for first cooling lubricant |
| D = | withdrawal system for second cooling lubricant |
| E = | system for returning the mixture of first and second cooling lubricants to the filter system I after use in the metal-working process |
| F = | bypass system ($V_{2'}$) for the fine filtration of very fine pigments (e.g. microfilter or magnetic separator) from a partial stream of the second cooling lubricant from the collection container |
| G = | direct separation of course dirt from the total stream (filter system I) |
| H = | separation system for the efficient orientation of a pure and steadied floatate phase (first cooling lubricant). Elimination of turbulence in the system. Protective device against very fine suspended pigments. |
| I = | total stream filter system (e.g. gravity-vacuum- |

-continued

| | Legend to the Drawings |
|---|---|
| | excess or low-pressure band filter; alluvial filter, bag filter, etc.) for the coarse filtration of the total amount of returned first and second cooling lubricants |
| J = | micro-windo for showing diagrammatically gravity separation in the aqueous phase |
| | A = floating, finely dispersed oil droplets |
| | B = settling very fine pigments |
| $V_1$ = | Amount by volume of first cooling lubricant |
| $V_2$ = | amount by volume of second cooling lubricant |
| $V_{1,2}$ = | volume flows of first and second cooling lubricants (volumes per unit time) |
| S = | engagement for box spanner for displacing the nozzle along a thread |

DESCRIPTION OF THE INVENTION

The present invention provides a process for the cutting or non-cutting forming of metals using two cooling lubricants, wherein an oil or a first emulsion having an oil content of at least 10 wt. % is applied to the workpiece, as a first cooling lubricant, at the tribo-zone and, at the same time, an oil-free cooling lubricant or a second emulsion that is an oil-in-water emulsion having an oil content of less than 10 wt. % is applied, as a second cooling lubricant, adjacent to the site of the tribo-zone. The term "tribozone" is to be understood as meaning that point on the workpiece at which high friction force occur as a result of the engagement of the tool. That is, for example, the point at which the chips or the abraded metal are produced. In the case of non-cutting forming, it is the point at which the metal is liquefied by the action of the tool (for example the die). In general, the tribo-zone is the point at which the tool acts on the workpiece to shape it and which must, therefore, be well lubricated.

The essence of the present invention is, therefore, that in the cutting or non-cutting forming of metals there is used not one cooling lubricant, but two different types of cooling lubricant. The first cooling lubricant is a pure oil or an oil-rich phase, which exhibit an especially good lubricating action. The first cooling lubricant is preferably an oil that contains as little water as possible. The first cooling lubricant may, however, also be an oil-rich water-in-oil or an oil-in-water emulsion that has an oil content of at least 10 wt. %. The oil content is preferably at least 20 wt. % and especially at least 50 wt. %. The first cooling lubricant is applied to the workpiece as close to the tribo-zone as possible. It is, therefore, applied specifically at the point at which the tool engages with the workpiece to shape it and where, accordingly, especially good lubrication is necessary. At the same time, the second cooling lubricant is applied to the workpiece adjacent to the tribo-zone, that is to say at the periphery. The second cooling lubricant may be applied as a jet (or stream) or as a plurality of jets. Particular preference is given to an embodiment described in detail below, in which a conical jet of the second cooling lubricant surrounds a narrower jet of the first cooling lubricant concentrically. The expression "adjacent to the tribo-zone" is to be understood as meaning that the second cooling lubricant is applied to the workpiece close to the tribo-zone (point at which chips are produced), but sufficiently remote from the tribo-zone that the action of the first cooling lubricant is not impaired. That is the case where the second cooling lubricant is applied to the workpiece in the region adjoining the tribo-zone (=periphery). The second cooling lubricant principally has the function of cooling the workpiece and the tool and carrying away the abraded metal and/or the chips. In addition, the second cooling lubricant especially serves to protect against corrosion. Accordingly, the second cooling lubricant may be so optimised that it fulfills its part functions especially well without having to exhibit a pronounced lubricating action.

In principle, the process according to the present invention may be so carried out that the two cooling lubricants are discarded after being used once. That is uneconomical, however, and is also disadvantageous in terms of ecology. Instead, the process according to the present invention is preferably carried out in such a manner that the cooling lubricants running off the workpiece are together collected in a storage container (=first container). Since the first cooling lubricant and the second cooling lubricant mix together only slightly, and preferably not at all, phase separation between the first and second cooling lubricants occurs in the first container, an oil-rich phase of first cooling lubricant and a water-rich phase of second cooling lubricant separating out. While the two cooling lubricants are being returned together from the metal-working site to the storage container, the second cooling lubricant cools the first cooling lubricant, which has been heated to an especially great extent by the frictional heat produced at the tribo-zone. That cooling process continues in the storage container during phase separation, where the first cooling lubricant separates from the second cooling lubricant in the form of droplets and hence with a high surface area. Accordingly, the second cooling lubricant not only cools the tool and the workpiece in the area surrounding the tribo-zone, but also cools the first cooling lubricant directly before it is used again.

The oil-rich first cooling lubricant will usually float on the water-rich second cooling lubricant. Since that takes some time, depending on the combination of first and second cooling lubricant actually selected, the construction of the container is such that sufficient time remains for phase separation before the two cooling lubricants are fed to the metal-working process again.

In order to complete phase separation between the first cooling lubricant and the second cooling lubricant it may be advantageous to provide a second container, the phase of the first cooling lubricant separated out in the first container being transferred from the first container into the second container and further phase separation between the first and second cooling lubricants taking place in the second container. As a result of that second phase separation, a phase of the first cooling lubricant that is even richer in oil separates out in the second container from the water-rich phase of the second cooling lubricant that was previously still mixed in. Better phase separation is thereby achieved than with the use of a single container.

The water-rich phase of the second cooling lubricant separated out in the second container is preferably returned to the first container. Advantageously, that is effected in such a manner that the phase of the second cooling lubricant returned from the second container to the first container passes into the first container at a point that is located below the boundary surface between the first and second cooling lubricants.

Corresponding pumps may be provided for transferring the first cooling lubricant from the first container into the second container and for returning to the first container the phase of the second cooling lubricant separated out again in the second container. However, the process is preferably carried out so that the bottom of the second container is higher than the bottom of the first container, so that the phase of the second cooling lubricant separated out in the second container may be returned to the first container by gravity. The phase of the second cooling lubricant separated out in the second container may be returned to the first container continuously or discontinuously. In the case of a discontinuous procedure, the level in the second container is preferably determined, which may be effected, for example, by means of a float, and when a given level is reached, a valve, for example a solenoid valve, in the pipe for returning the separated phase of the second cooling lubricant from the second container to the first container opens. The valve may then close automatically controlled by time or by flow or, more simply, by the level in the second container reaching a given lower value. Opening and closing of the valve is preferably effected by coupling the level meter directly to the valve.

If the level in the second container falls below a given level even though the valve in the return pipe to the first container is closed, that may be because more of the first cooling lubricant is removed from the second container than is supplied from the first container. In that case, it is possible to provide for an increase in the amount of the first cooling lubricant in the first container, and hence, indirectly, also in the second container, by adding the first and second cooling lubricant to the first container separately or in the form of a mixture. The ratio of first to second cooling lubricant may be adjusted as desired. Of course, pure first cooling lubricant may also be supplied to the first container.

The withdrawal of the separated phase of the first cooling lubricant from the first container for transfer into the second container is preferably carried out by means of a float-type suction device.

Irrespective of whether one or two containers are provided, solid impurities are advantageously removed from the separated phase of the second cooling lubricant in the first container. Such largely metallic impurities enter the cooling lubricant as a result of the metal-working processes. Since the separated phase of the second cooling lubricant generally has a lower viscosity than the first cooling lubricant or a mixture of the two cooling lubricants, those solid impurities can be removed especially easily from the separated phase of the second cooling lubricant. Preferably, that is effected by withdrawing a portion of the separated phase of the second cooling lubricant and guiding it through a device for separating off solids. That device may be, for example, a magnetic separator, a sieve, a filter or a centrifuge. Where a centrifuge is used as the separator device and where two containers are present, there is preferably selected a three-phase centrifuge which separates from the second cooling lubricant not only the solid impurities but also, as a second liquid phase, amounts of the first cooling lubricant still emulsified therein. In that case, the separated second cooling lubricant is preferably returned to the first container, while the separated phase of the first cooling lubricant is preferably transferred into the second container.

The process according to the present invention is preferably carried out in such a manner that, after phase separation, the first and second cooling lubricants are applied to the workpiece again in the manner described above. The two cooling lubricants may therefore be circulated and used again and again for weeks or months, under favorable conditions even for years, before they have to be processed by known methods or replaced. In this connection, the maintenance measures for cooling lubricants known in the art of metal cutting, for example removal of the chips and the abraded material and, if necessary, the prevention of biological contamination, are preferably provided.

Figure 2:
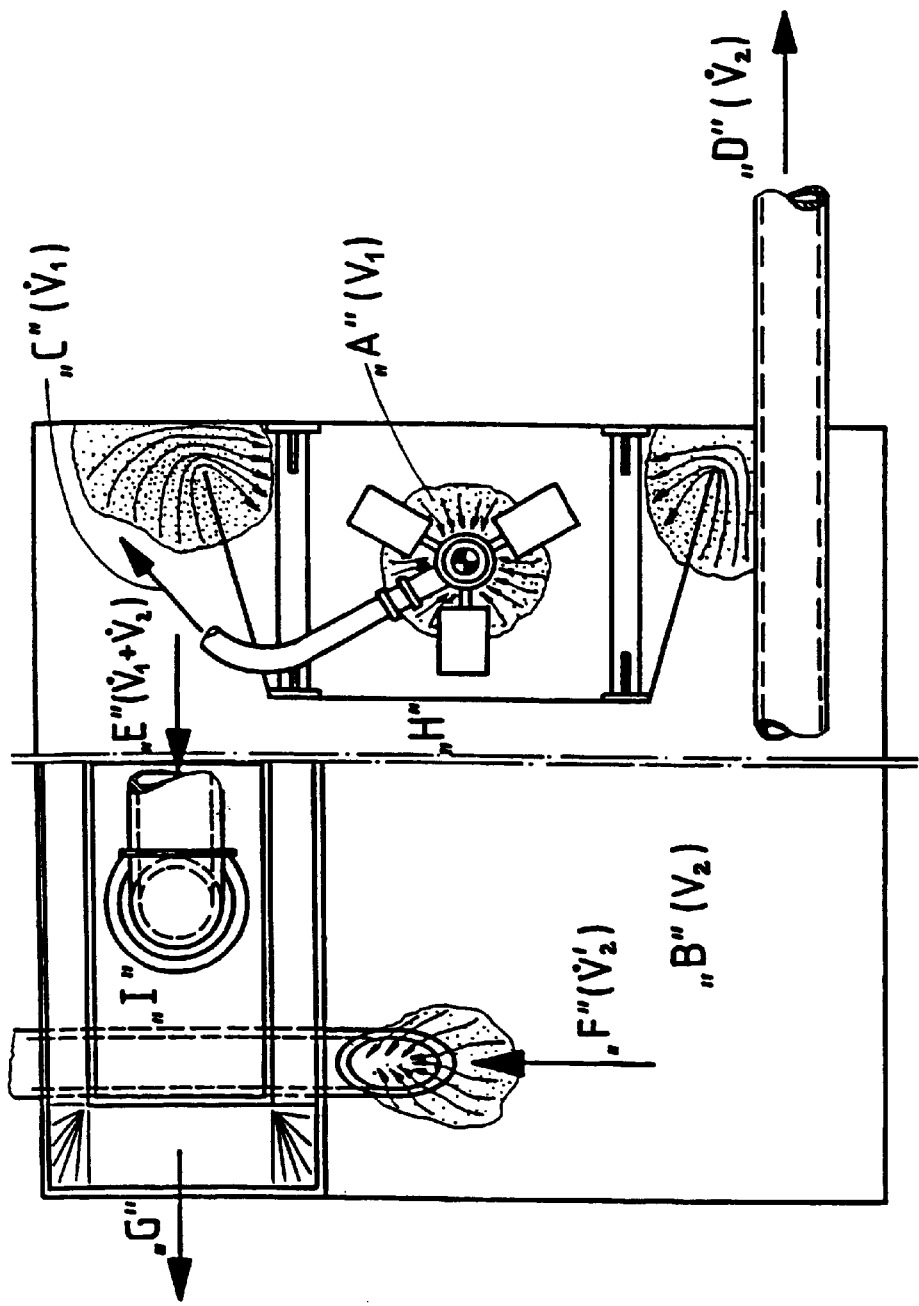
FIG. 2 depicts a plan view of the container of FIG. 1, showing flow of the first cooling lubricant around protective plates to the withdrawal system.

Accordingly, there are provided in the process according to the present invention two withdrawal points for the removal of the two cooling lubricants from the storage container. Each withdrawal point extends into the desired phase of the first or second cooling lubricant. The withdrawal points are preferably so formed that the withdrawal point for the second cooling lubricant, which is generally specifically more dense, is located close to the bottom of the container, while the withdrawal point for the first cooling lubricant, which is generally specifically lighter, floats on the surface of the cooling lubricant. The position of the withdrawal point then adapts to the level of the liquid, for example by means of a skimmer system. FIG. 1 shows by way of example a side view of a storage container with the two separate phases of cooling lubricant one (top) and cooling lubricant two (bottom), as well as the two separate withdrawal points for cooling lubricant one ("C") and cooling lubricant two ("D"). The volume ratio of cooling lubricant one to cooling lubricant two in this example is approximately from 1:10 to 1:20. As is shown in the associated plan drawing (FIG. 2), the withdrawal device for cooling lubricant one carried by a skimmer system (skimmer system "C") is located close to the edge of the storage container and is screened from the main volume of the cooling lubricants by a plate system ("H") that opens towards the edge of the storage container. The plate system serves as a stabilising zone and prevents or at least reduces possible mixing of cooling lubricant one and cooling lubricant two as a result of turbulence.

The enlarged section "J" shows an enlarged section of phase "B" of cooling lubricant two. Dots and arrows indicate that the phase consisting of cooling lubricant one, which in this case is the lighter phase, rises upwards out of the phase consisting of cooling lubricant two. At the same time, fine pigments originating from the metal-working separate downwards, where they are either deposited or, preferably, are withdrawn by way of a bypass system "F" and may be removed from the aqueous phase (for example by means of a microfilter or a magnetic separator).

In one specific embodiment, the first cooling lubricant is a water-immiscible oil as is known in the art, for example, as a "cutting oil" or a "forming oil". However, as indicated above, the first cooling lubricant may also be a water-in-oil or oil-in-water emulsion. That may be the case especially when phase separation in the storage container does not take place completely, but oil and water are emulsified with each other. However, that may be optimised as regards the actual process conditions by way of chemico-technical product selection.

Irrespective of whether the first cooling lubricant is in the form of a largely anhydrous oil or a water-containing emulsion, the oil may be selected from those oils which are known in the art for use as cooling lubricants. They may be, for example, paraffinic or naphthenic mineral oils. Synthetic or natural ester oils may also be employed. Natural ester oils are oils of vegetable or animal origin which may be used as obtained directly from the natural source or after chemical modification steps, for example transesterification. It is also possible to use acetals or ethers that are not miscible in any ratio with water, preferably alkyl compounds having from 8 to 20 carbon atoms. In general, oils may be used that satisfy the definition that they are liquids that are not miscible with water in any ratio and that have a higher viscosity than water. The oils may contain additional lubricating additives, such as are known as so-called "EP additives". They may be halo- or phosphorus-organic compounds, for example halo-paraffins or phosphoric acid esters. However, there are preferably used for general machining sulfur-containing EP additives, for example sulfurised oils or organic polysulfides. Specific examples are diisononyl pentasulfide, dibenzyl disulfide and di-t-dodecyl polysulfide. For cubic boric nitride—high speed grinding ("CBN-HSG"), phosphorus-containing EP additives are preferably used.

The second cooling lubricant has the multiple function of cooling, rinsing, chip removal and corrosion protection. Accordingly it is preferred for the second cooling lubricant at least to contain corrosion inhibitors.

There come into consideration as corrosion inhibitors, for example, salts of carboxylic acids corresponding to general formula (I):

$$R^3\text{—COOH} \tag{I}$$

wherein $R^3$ represents an aliphatic, linear or branched hydrocarbon radical having from 5 to 23 carbon atoms and 0 or from 1 to 5 double bonds, or an $R^4$—Ph—COCH=CH group wherein $R^4$ represents a linear or branched alkyl radical having from 8 to 18 carbon atoms and Ph represents a phenyl group. $R^3$ may also represent an aromatic radical.

Typical examples are the fatty acids caproic acid, caprylic acid, capric acid, isononanonic acid, lauric acid, myristic acid, palmitic acid, palmoleic acid, stearic acid, isostearic acid, oleic acid, elaidic acid, petroselinic acid, linoleic acid, linolenic acid, elaeostearic acid, arachidic acid, gadoleic acid, arachidonic acid, behenic acid, erucic acid and clupanadonic acid, and the technical mixtures thereof, as are formed, for example, in the pressure cleavage of natural fats and oils. There are preferably used carboxylic acids (I) wherein $R^3$ represents alkyl radicals having from 5 to 17 carbon atoms.

Examples of substituted carboxylic acids may be found among the allylbenzoylacrylic acids. Particular preference is given to the use of 3-(p-dodecylbenzoyl)acrylic acid.

The acids mentioned may be used especially in the form of alkali metal, alkaline earth metal, ammonium, alkylammonium and/or zinc salts.

Anionic surfactants of the petroleum sulfonate type come into consideration as a further group of corrosion inhibitors. Those surfactants are sulfoxidation products of paraffin fractions having, on average, from 6 to 30, especially from 10 to 20, carbon atoms. The petroleum sulfonates may also be regarded as being secondary alkanesulfonates, with alkali metals or alkaline earth metals, ammonium or alkylammonium coming into consideration as counter-ions. The petroleum sulfonates are preferably used in the form of the sodium or calcium salts thereof.

There come into consideration as a further group of corrosion inhibitors sulfonisation products of unsaturated fatty acid glyceride esters corresponding to general formula (II), so-called "sulfotriglycerides" or "sulfoils":

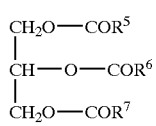

wherein $R^5CO$ represents an unsaturated acyl radical having from 16 to 24 carbon atoms and from 1 to 5 double bonds, and $R^6CO$ and $R^7CO$ independently represent acyl radicals having from 6 to 24 carbon atoms and 0 or from 1 to 5 double bonds.

Sulfotriglycerides are known substances which may be obtained, for example, by adding sulfur trioxide or chlorosulfonic acid to unsaturated triglycerides, especially rapeseed oil or sunflower oil. In the case of the agents according to the present invention, sulfonated rapeseed oil in the form of the sodium, calcium, ammonium or alkylammonium salt is preferably used.

There come into consideration as corrosion inhibitors also, individually or in combination, alkanolamines and salts thereof, especially carboxylic acid salts, sulfonates, organic boron compounds, especially boric acid esters, fatty acid amides, aminodicarboxylic acids, dimeric fatty acids, phosphoric acid esters, thiophene acid esters, dialkyl dithiophosphates, mono- and di-alkylarylsulfonates, benzotriazoles and polyisobutenesuccinic acid derivatives, some of which also have emulsifying properties.

If the second cooling lubricant is an oil-in-water emulsion, it may contain as the oily phase those oils which may also be used for the first cooling lubricant. In that case, the second cooling lubricant contains emulsifiers which hold the desired amount of oil in dispersion. By selecting the nature and amount of the emulsifiers, the phase separation between the first and second cooling lubricants may be controlled.

There come into consideration as emulsifiers addition products of ethylene oxide and/or propylene oxide with compounds having acidic hydrogen atoms or fatty acid esters. Those products are to be understood as being, for example, alkoxylation products of fatty alcohols, alkylphenols, fatty acids, fatty amines, fatty acid methyl esters and sorbitan esters, which may be obtained in accordance with known processes.

Typical examples are addition products of, on average, from 1 to 20, preferably from 2 to 10, moles of ethylene oxide and 0 or from 1 to 5 moles of propylene oxide with fatty alcohols having from 6 to 22 carbon atoms, alkylphenols having from 4 to 12 carbon atoms in the alkyl moiety and fatty acids, fatty amines and fatty acid esters in each case having from 6 to 22 carbon atoms in the fatty moiety. Particular preference is given to addition products of from 2 to 10 moles of ethylene oxide with lauryl or $C_{12/14}$-coconut fatty alcohol (conventional or concentrated homologue distribution), with octylphenol, lauric or $C_{12/14}$-coconut fatty acid, laurylamine, coconut fatty acid methyl ester and/or sorbitan monolaurate.

In addition to the mentioned non-ionic emulsifiers, there come into consideration also anionic surfactants, such as soaps, sulfonates and alkyl phosphates. Typical examples of that group of compounds are alkali metal soaps of fatty acids, naphthenic soaps, alkylarylsulfonates, alkanesulfonates, alkylbenzenesulfonates, alkyl sulfates and alkyl ether sulfates.

For preparing the cooling lubricant emulsion in very soft water, the following combination especially is suitable as the emulsifier system:

(a) ethoxylates/propoxylates of fatty alcohols having from 8 to 18 carbon atoms in the alcohol with from 2 to 6 ethylene oxide units and from 4 to 8 propylene oxide units; and (b) fatty alcohols and/or fatty alcohol propoxylates having from 12 to 24 carbon atoms in the alcohol and from 0 to 3 propylene oxide units and/or distillation residue of those fatty alcohols;

in a ratio, by weight, of (a):(b)=from 1:0.3 to 0.3:1.

That emulsifier system is described in detail in DE-A-197 03 083.

If the second cooling lubricant is an oil-in-water emulsion, it may be necessary to stabilise it against biological contamination, which may lead to foul odours and may also be damaging to health. Biological contamination may also have an adverse effect on the viscosity of the cooling lubricant. It may, therefore, be necessary either to add biocides to the second cooling lubricant or to subject it to some other germicidal treatment, for example exposure to ultraviolet radiation or the blowing in of air in the case of anaerobic attack.

There may be used as the second cooling lubricant cooling lubricant emulsions as are customary in the art at present. They are known by the generic term "water-mixed cooling lubricants". However, the second cooling lubricant may also be a largely oil-free aqueous phase. Such oil-free cooling lubricants are known as grinding solutions. The action thereof involves especially, cooling, rinsing and protecting against corrosion. They therefore contain one or more corrosion inhibitors exemplified above. Grinding fluids may contain polyglycols as a component having a slight lubricating action.

Figure 3:
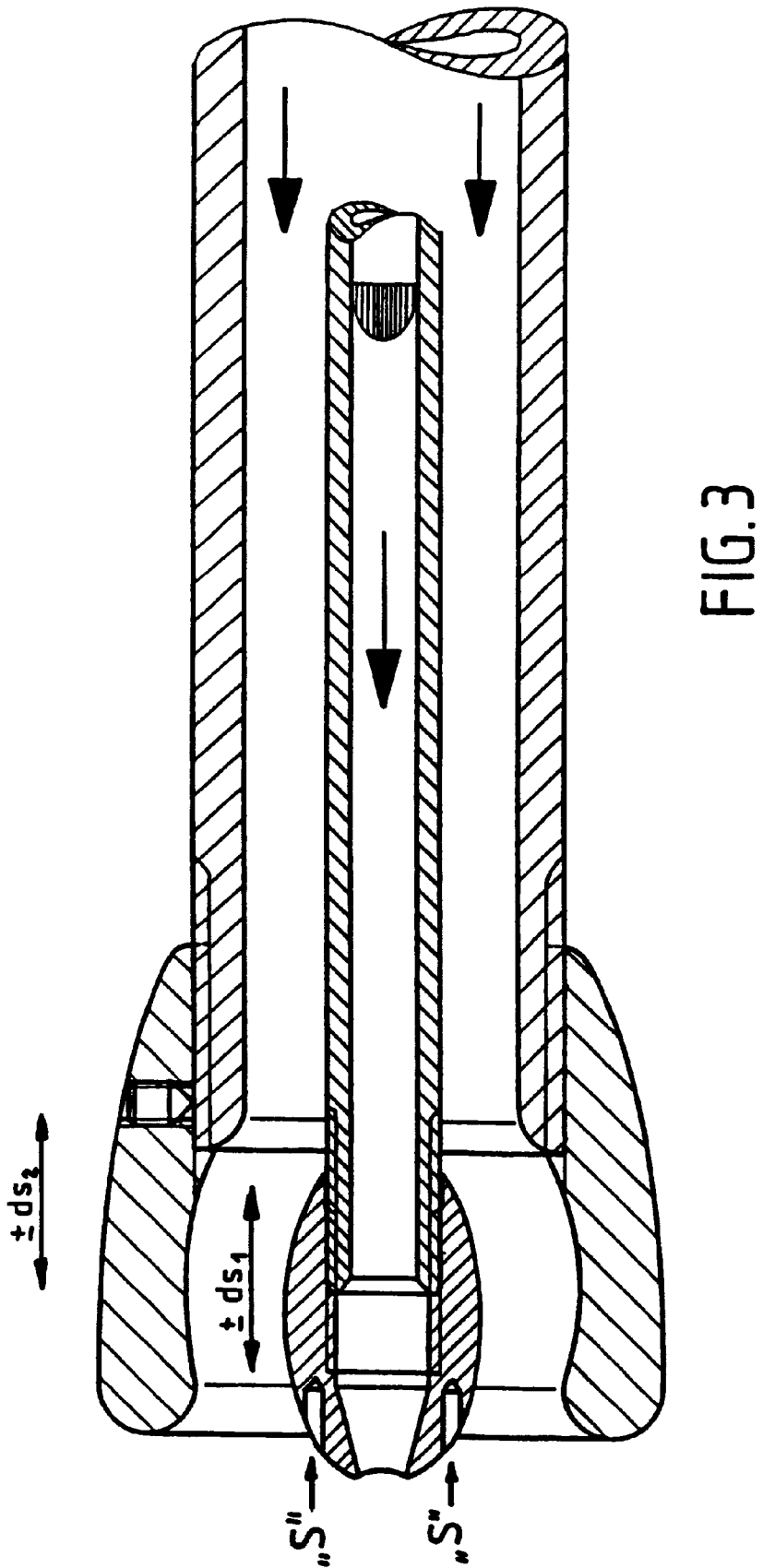
FIG. 3 depicts a nozzle for simultaneous application of the first and second cooling lubricants.

A possible embodiment of the process according to the present invention involves applying the first and second cooling lubricants to the workpiece by way of at least two separate nozzles. In that process, one nozzle is generally sufficient for the first cooling lubricant, while the second cooling lubricant may flow on to the workpiece from one or more nozzles. However, the procedure is preferably such that the first and second cooling lubricants are applied to the workpiece in the form of a two-component spray jet by way of a two-component nozzle, in such a manner that the jet of first cooling lubricant is surrounded concentrically by the jet of second cooling lubricant. The jet of first cooling lubricant is then aimed directly at the tribo-zone, for example the cutting edge of a drill or of a cutter. The condition that the second cooling lubricant be applied to the workpiece immediately adjacent to the first cooling lubricant is then fulfilled automatically. The first and second lubricants are each supplied through a separate pipe to a nozzle, the nozzle for the second cooling lubricant surrounding that for the first cooling lubricant concentrically. That means that the two-component nozzle has an outer nozzle space and an inner nozzle space, the outer nozzle space surrounding the inner nozzle space concentrically and the first cooling lubricant being applied to the tribo-zone, or to the workpiece, through the inner nozzle space and the second cooling lubricant being applied through the outer nozzle space. An example of such a two-component nozzle is shown in FIG. 3. In that example, the nozzle space of the outer nozzle is separated from that of the inner nozzle by a flow body, for example a so-called Prandtl drop. The flow body ensures that the second cooling lubricant flows in a largely laminar manner so that, after emerging from the nozzle, it scarcely intermingles with the first cooling lubricant. A two-component nozzle has the advantage that it may be made to follow the tool especially accurately. As a result, it is possible to ensure that the two cooling lubricants impinge on the workpiece in such a manner that optimal lubrication and optimal cooling/chip removal are guaranteed. In addition, the two-component nozzle may be matched to the tribo-process in the optimum manner by the supply pressure and supply volume and by changing the adjustable nozzle outlet geometry.

When a two-component nozzle is used, the first cooling lubricant is preferably fed through the nozzle at a higher pressure than is the second cooling lubricant. For example, the first cooling lubricant may be passed through the nozzle at a pressure of >5 bar, for example up to about 30 bar. For the second cooling lubricant, a pressure of from about 1 to about 5 bar is preferably selected.

The two-component nozzle is preferably constructed in such a manner that its two nozzle openings may be displaced, independently of each other, parallel to the longitudinal axis of the nozzle by the distances $\pm ds_1$ and $\pm ds_2$, respectively. That may be effected, for example, with the aid of a thread. It has the advantage that the geometry of the two spray jets may be adapted to the geometry of the tool, depending on the nozzle position. Accordingly, it is not necessary when changing the tool to provide a different two-component nozzle whose geometry is optimised as regards the tool. Rather, adaptation may be effected by displacing the two nozzle openings parallel to the nozzle axis, it being possible to optimise the respective jet in synergy with the variables pressure and volume flow per unit time.

Therefore, when the two-component nozzle is used, the inner jet of oil or oil-rich emulsion, which preferably emerges at a relatively high pressure, is surrounded by a jacket of the second cooling lubricant, which preferably emerges from the nozzle at a lower pressure than does the first cooling lubricant. As a result, the first cooling lubricant is prevented from being finely atomised at the nozzle outlet. As a result, the formation of aerosols of cutting or forming oil, which are critical in terms of work hygiene and are potentially explosive and which, when such an oil is used alone, lead to the problems mentioned above, is not possible. Rather, any aerosol drops that form, which may have a droplet size below 1.5 μm, are immediately contained in the surrounding jacket of cooling lubricant two and are carried away.

The use of the two-component nozzle is especially advantageous when the tool penetrates the workpiece only superficially. In the case of metal-working operations that penetrate more deeply, such as deep drilling, or in the case of fine operations, such as rubbing, in particular in the case of single- and double-edged cutting reamers, a different embodiment of the process according to the present invention is preferred. In such process steps, the first cooling lubricant is preferably fed to the tribo-zone by way of one or more channels in the tool, for example in the press die or in the drill, while the second cooling lubricant is applied to the workpiece outside the tool, that is to say at the periphery. The second cooling lubricant is preferably supplied in the form of a stream.

This ensures that an especially good lubricating action is achieved in the tribo-zone even in the case of tools that penetrate deep into the workpiece. Cooling, binding of the fine abraded material and the removal of chips take place adjacent to the point at which chips are produced, but in the immediate vicinity thereof (periphery of tool and workpiece). In that case, the first cooling lubricant is preferably fed through the tool at a pressure of from about 50 to about 90 bar, especially from about 70 to about 90 bar. As regards the second cooling lubricant, it is sufficient to feed it at a pressure of from about 1 to about 5 bar.

Irrespective of the embodiment selected, the process according to the present invention is so carried out that more second cooling lubricant than first cooling lubricant is applied to the tool per unit time. For example, the ratio of first to second cooling lubricant applied to the workpiece per unit time may be from about 1:5 to about 1:30, preferably from 1:10 to 1:20. This arises from the statement of functions, according to which the principal function of the first cooling lubricant is lubrication. A smaller volume flow per unit time is sufficient therefor than for the second cooling lubricant, which must both dissipate the heat that is produced and carry away the chips or the abraded material formed. For most technical metal-working steps, it is sufficient if the volume flow $V_1$ of the first cooling lubricant is from about 1 to about 10 liters/minute, preferably from about 5 to about 20 liters/minute. The volume flow $V_2$ of the second cooling lubricant is then to be adapted accordingly.

The process according to the present invention has the advantage that it uses a cooling lubricant combination which may be optimised separately both in respect of lubricating action and in respect of heat dissipation, chip removal and corrosion protection. The combined objects of cooling and lubrication may be better achieved using that combination than using conventional cooling lubricant emulsions, which represent a compromise in respect of lubricating action and cooling action. In comparison with pure cutting oils, the combination of two cooling lubricants to be provided according to the present invention is less expensive and easier to handle. The process according to the present invention enjoys the advantages of the use of pure cutting or forming oils or of oil-rich emulsions for the actual task of lubrication in the tribo-zone, without exhibiting the disadvantages, outlined in the introduction, of the use of such oils as the only cooling lubricant. The surrounding water jet prevents the oil from becoming turbulent on emerging from the nozzle. As a result, the risk of aerosol formation and its undesired consequences (risk of deflagration, risk of explosion) is reduced. Furthermore, the disadvantages of aerosol formation as regards work hygiene are avoided.

On account of the low oil content, the mixture of first and second cooling lubricants returning from the metal-working machine may be freed of solids (chips, abraded metal) more readily than could a pure oil. Grinding swarf in particular is easier to remove from the low-oil mixture than from a viscous oily phase. In addition to or instead of that coarse filtration on return, the removal of fine abraded material, such as grinding swarf, from the phase consisting of cooling lubricant two may be carried out in the storage container. In that case, a portion of cooling lubricant two is withdrawn from the storage container by way of a bypass line ("F" in FIG. 1) and guided through a separator device, for example a fine filter or a magnetic separator. Use is thus made of the advantage that fine abraded material is easier to remove from an aqueous phase than from an oily phase.

By suitably selecting the first and second cooling lubricants, the cooling lubricant system may be adapted both to the nature of the metal-working step and to the material of the workpiece. For example, it is possible to provide that the second cooling lubricant contains specialised corrosion inhibitors for light metals or for colored metals. In general, commercially available cooling lubricants that satisfy the description given above may be used both as the first cooling lubricant and as the second cooling lubricant. Particular adaptation of the cooling lubricants to the procedure according to the present invention is not necessary.

In a further embodiment, the present invention relates to a device for carrying out the process described above, having (a) a first container and (b) a second container, (c) a pipe for returning the used mixture of first and second cooling lubricants to the first container, (d) a withdrawal pipe in the first container for withdrawing the separated phase of the second cooling lubricant, (e) a transfer pipe for transferring the separated phase of the first cooling lubricant into the second container, (f) a withdrawal pipe in the second container for withdrawing the separated phase of the first cooling lubricant, and (g) a return pipe for returning to the first container the phase of the second cooling lubricant separated out in the second container.

In that device, the pipe (c) serves to return the used mixture of first and second cooling lubricants from the metal-working or metal-forming devices to the first container. Phase separation between the first and second cooling lubricants may begin even in that pipe and continues in the first container (a). The withdrawal pipe (d) in the first container for withdrawing the separated phase of the second cooling lubricant begins in the first container expediently at a point at which there is as little turbulence as possible and at which the phase of the second cooling lubricant has at least largely separated from the phase of the first cooling lubricant. The second cooling lubricant is fed to the metal-working or metal-forming devices through the withdrawal pipe (d). The transfer pipe (e) for transferring the separated phase of the first cooling lubricant into the second container begins in the first container expediently at a point at which there is as little turbulence as possible and at which the phase of the first cooling lubricant has already largely separated from the phase of the second cooling lubricant. In practice, however, the phase of the first cooling lubricant may still contain amounts of the second cooling lubricant emulsified therein. That is the case especially if the volume of the first container does not permit an adequate dwell time for the cooling lubricants before the cooling lubricants are to be withdrawn again. The opening of the transfer pipe (e) in the first container is preferably so positioned by means of a float system that it is always located at or a few centimeters below the surface of the fluid in the first container. The withdrawal of the first cooling lubricant from the first container and the transfer thereof into the second container may be carried out, for example, with the aid of a pump. In the second container, the transfer pipe (e) preferably ends at such a point that the phase of the second cooling lubricant separating out in the second container intermingles with the first cooling lubricant as little as possible. Phase separation between the first and second cooling lubricants continues in the second container. The first cooling lubricant, freed of intermixed second cooling lubricant, is withdrawn from the second container through the withdrawal pipe (f) and fed to the metal-working or metal-forming devices. The phase of the second cooling lubricant separating out in the second container is transferred into the first container through the return pipe (g). Since the second cooling lubricant usually has a higher density than the first cooling lubricant, it separates out at the bottom of the second container. The transfer pipe (g) preferably begins there. It may be advantageous for the bottom of the second container not to be flat or horizontal but to have a deepest point at which the return pipe (g) begins. In the first container, the return pipe (g) preferably ends at a point located below the boundary layer that forms in the first container between the first and second cooling lubricants.

In the first container, solid impurities, such as chips, abraded metal and grinding swarf, collect at least largely in the phase of the second cooling lubricant that separates out. For the continuous or discontinuous removal of those solid impurities from the second cooling lubricant, the first container preferably additionally has the following devices: (h) a recirculating pipe for withdrawing the separated phase of the second cooling lubricant from the first container, (i) a separator device for separating solid substances from a fluid, to which the separated phase of the second cooling lubricant is fed by way of the recirculating pipe (h), and a means for returning the phase of the second cooling lubricant separated from solid substances from the separator device (i) to the first container.

Accordingly, a portion of the phase of the second cooling lubricant is preferably fed to a separator device for separating off the solid impurities, and the second cooling lubricant, freed of solid impurities, is returned to the first container again. The withdrawal of the second cooling lubricant from the first container is preferably carried out by means of a pump, and return from the separator device is preferably carried out by gravity. Suitable separator devices are known in the art. There are suitable, for example, magnetic separators, sieves, fine filters or centrifuges. Several such separator devices may also be combined. Where a centrifuge is used as the separator device, there is preferably selected a three-phase centrifuge which separates from the second cooling lubricant not only the solid impurities but also, as a second liquid phase, amounts of the first cooling lubricant still emulsified therein.

In a preferred embodiment, the two containers are preferably so arranged that the bottom of the second container is higher than the bottom of the first container and the return pipe (g) begins at the bottom of the second container and ends in the first container in such a manner that the end of the return pipe (g) in the first container is lower than its beginning at the bottom of the second container. In an especially space-saving embodiment, the second container is arranged precisely or at least largely above the first container. By arranging the first and second containers so that they are offset in terms of height, the phase of the second cooling lubricant that separates out in the second container may be returned to the first container by gravity. In that case, therefore, no pump is required. Rather, it is sufficient to provide the return pipe (g) with a valve, preferably a solenoid valve, by means of which the return of the second cooling lubricant to the first container can be controlled. To that end there is preferably provided in the second container a level controller, for example a float-type switch, which opens the valve in the return pipe (g) when a given height of the fluid level in the second container is reached and thereby starts the return of second cooling lubricant from the second container to the first container. Closing of the valve may likewise be carried out by means of the mentioned float-type switch when the fluid level has reached a given lower limit. Alternatively, the valve may be closed again after a given time or after a given amount of fluid, which may be controlled by means of a flow meter, has passed through.

As a result of the described use of two containers, phase separation between the first and second cooling lubricants is improved.

CAPTIONS FOR THE FIGURES

FIG. 1

Common storage container for first cooling lubricant ("A") and second cooling lubricant ("B"). In the selected example, the first cooling lubricant is specifically lighter than the second cooling lubricant.

FIG. 2

Plan drawing of FIG. 1. Shows the flow of the first cooling lubricant around the protective plates "H" to the withdrawal system "C".

FIG. 3

Possible embodiment of a two-component nozzle for the simultaneous application of first and second cooling lubricants.

List of reference symbols

"A" = first cooling lubricant, e.g. grinding oil, cutting or forming oil, universal oil or highly concentrated EP emulsion, preferably on a natural basis
"B" = second cooling lubricant, e.g. passivating solution, grinding solution, or emulsion of low concentration
"C" = skimmer system as withdrawal system for first cooling lubricant
"D" = withdrawal system for second cooling lubricant
"E" = system for returning the mixture of first and second cooling lubricants to the filter system "I" after use in the metal-working process
"F" = bypass system ($V_2$,) for the fine filtration of very fine pigments (e.g. microfilter or magnetic separator) from a partial stream of the second cooling lubricant from the collection container
"G" = direct separation of coarse dirt from the total stream (filter system I)
"H" = separation system for the efficient orientation of a pure and steadied floatate phase (first cooling lubricant). Elimination of turbulence in the system. Protective device against very fine suspended pigments.
"I" = total stream filter system (e.g. gravity-vacuum-excess or low-pressure band filter; alluvial filter, bag filter, etc.) for the coarse filtration of the total amount of returned first and second cooling lubricants
"J" = micro-window for showing diagrammatically gravity separation in the aqueous phase (a = floating, finely dispersed oil droplets b = settling very fine pigments)
$V_1$ = amount by volume of first cooling lubricant
$V_2$ = amount by volume of second cooling lubricant
$V_{1,2}$ = volume flows of first and second cooling lubricants (volumes per unit time)
"S" = engagement for box spanner for displacing the nozzle along a thread

What is claimed is:

1. A process for cutting or non-cutting forming of metals with a tool using two cooling lubricants, wherein an oil or a first emulsion having an oil content of at least 10 wt. % is applied to a workpiece, as a first cooling lubricant, at a tribozone and at the same time an oil-free cooling lubricant or a second emulsion that is an oil-in-water emulsion having an oil content of less than 10 wt. % is applied, as a second cooling lubricant, adjacent to the site of the tribozone, wherein the first and second cooling lubricants are applied to the workpiece in the form of a two-component spray jet by way of a two-component nozzle, such that the jet of first cooling lubricant is surrounded by the let of second cooling lubricant, or wherein the first cooling lubricant is applied to the workpiece by way of one or more channels in the tool and the second cooling lubricant is applied to the workpiece outside the tool.

2. The process of claim 1 wherein the cooling lubricants running off the workpiece are together collected in a first container, phase separation taking place between the first and second cooling lubricants and an oil-rich phase of the first cooling lubricant and a water-rich phase of the second cooling lubricant separating out.

3. The process of claim 2 wherein a second container is provided, the oil-rich phase of the first cooling lubricant separated out in the first container being transferred from the first container into the second container and further phase separation between the first and second cooling lubricants taking place in the second container.

4. The process of claim 3 wherein the phase of the second cooling lubricant separated out in the second container is returned to the first container.

5. The process of claim 4 wherein the second container is higher than the first container, whereby the phase of the second cooling lubricant separated out in the second container is returned to the first container by gravity.

6. The process or claim 3 wherein, when the level of the cooling lubricants in the second container falls below a given level, fresh first and second cooling lubricant are added to the first container separately or together.

7. The process of claim 2 wherein solid impurities are removed from the separated water-rich phase of the second cooling lubricant in the first container.

8. The process of claim 2 wherein, after phase separation, the first and second cooling lubricants are applied again according to claim 1.

9. The process of claim 1 wherein the first cooling lubricant is a water-immiscible oil.

10. The process of claim 1 wherein the first cooling lubricant is a water-in-oil or an oil-in-water emulsion having an oil content of at least 10% by weight.

11. The process of claim 9 wherein the oil is selected from the group consisting of paraffinic or naphthenic mineral oils, from ester oils of synthetic, vegetable or animal origin, and from water-immiscible acetals or ethers.

12. The process of claim 1 wherein the second cooling lubricant comprises one or more corrosion inhibitors.

13. The process of claim 1 wherein the first and second cooling lubricants are applied to the workpiece by way of at least two separate nozzles.

14. The process of claim 1 wherein the two-component nozzle has an outer nozzle space and an inner nozzle space, the outer nozzle space surrounding the inner nozzle space concentrically and the first cooling lubricant being applied to the workpiece through the inner nozzle space and the second cooling lubricant being applied through the outer nozzle space.

15. The process of claim 14 wherein the first cooling lubricant is fed through the two-component nozzle at a higher pressure than is the second cooling lubricant.

16. The process of claim 14 wherein the two nozzle openings of the two-component nozzle are displaceable, independently of each other, parallel to the longitudinal axis of the nozzle.

17. The process of claim 1 wherein the first cooling lubricant is fed at a pressure of from 50 to 90 bar and the second cooling lubricant is fed at a pressure of from 1 to 5 bar.

18. The process of claim 1 wherein more of the second cooling lubricant than the first cooling lubricant is applied to the workpiece per unit time.

19. The process of claim 4, wherein, when the level of the cooling lubricants in the second container falls below a given level, fresh first and second cooling lubricant are added to the first container separately or together.

20. The process of claim 5, wherein, when the level of the cooling lubricants in the second container falls below a given level, fresh first and second cooling lubricant are added to the first container separately or together.

21. The process of claim 3 wherein solid impurities are removed from the separated water-rich phase of the second cooling lubricant in the first container.

22. The process of claim 3 wherein, after phase separation, first cooling lubricant from the second container and second cooling lubricant from the first container are recovered and applied to the workpiece being formed.

23. The process of claim 10 wherein the first cooling lubricant has an oil content of at least 20 wt. %.

24. The process of claim 10 wherein the oil is selected from the group consisting of paraffinic or naphthenic mineral oils, from ester oils of synthetic, vegetable or animal origin, and from water-immiscible acetals or others.

25. The process of claim 15 wherein the two nozzle openings of the two-component nozzle are displaceable, independently of each other, parallel to the longitudinal axis of the nozzle.

26. A device for cutting or non-cutting forming of a metal workpiece, comprising one or more tools for metal forming, a means of applying a first cooling lubricant comprising an oil or a first emulsion having an oil content of at least 10 wt. % at a tribozone, a means of applying a second cooling lubricant comprising an oil-free cooling lubricant or a second emulsion that is an oil-in-water emulsion having an oil content of less than 10 wt. % adjacent to the tribozone, a first container for collecting run-off of the first and second cooling lubricants from the workpiece, in which first container the first and second cooling lubricants separate into their respective phases, a second container for receiving the separated phase of first cooling lubricant from the first container, In which second container the separated phase of first cooling lubricant from the first container undergoes further phase separation into the respective phases of first and second cooling lubricants, a means of transferring the separated phase of first cooling lubricant from the first container to the second container, a means of transferring the separated phase of second cooling lubricant from the second container to the first container, a means of recirculating the separated phase of first cooling lubricant from the second container to the means of applying the first cooling lubricant to the workpiece, and a means of recirculating the separated phase of second cooling lubricant from the first container to the means of applying the second cooling lubricant to the workpiece, wherein the first and second cooling lubricants are applied to the workpiece in the form of a two-component spray jet by way of a two-component nozzle, such that the jet of first cooling lubricant is surrounded by the jet of second cooling lubricant, or wherein the first cooling lubricant is applied to the workpiece by way of one or more channels in the tool and the second cooling lubricant is applied to the workpiece outside the tool.

27. The device of claim 26, further comprising a means for withdrawing from and recirculating to the first container the, separated phase of second cooling lubricant, said means including a device for separating solids from the second cooling lubricant.

28. The device of claim 26, wherein the separated phase of second cooling lubricant from the second container is transferred to the first container by means of gravity.

* * * * *

UNITED STATES PATENT AND TRADEMARK OFFICE
CERTIFICATE OF CORRECTION

PATENT NO. : 6,705,142 B1
DATED : March 16, 2004
INVENTOR(S) : Rieger et al.

It is certified that error appears in the above-identified patent and that said Letters Patent is hereby corrected as shown below:

<u>Title page,</u>
Item [30], Foreign Application Priority Data, DE 100 21 168, the date should read -- April 29, 2000 --.

<u>Column 14,</u>
Line 45, delete "let" and insert -- jet --.

<u>Column 16,</u>
Line 8, delete "others" and insert -- ethers --.
Line 27, replace "IN" with -- in --.
Line 51, delete the comma after the word "the".

Signed and Sealed this

Twenty-ninth Day of June, 2004

JON W. DUDAS
*Acting Director of the United States Patent and Trademark Office*